United States Patent [19]

MacKay

[11] 4,095,515
[45] Jun. 20, 1978

[54] OVERLOAD INDICATOR

[75] Inventor: Ralph J. MacKay, Novi, Mich.

[73] Assignee: Gladd Industries, Inc., Detroit, Mich.

[21] Appl. No.: 728,811

[22] Filed: Oct. 1, 1976

[51] Int. Cl.$^2$ .......................... A23B 4/00; A23L 3/02; B65G 43/06
[52] U.S. Cl. ................... 99/337; 99/443 C; 137/68 R; 198/856
[58] Field of Search ............... 99/337, 443 C, 468, 99/486, 492; 198/751, 719, 856; 73/40; 64/26, 28 R, DIG. 1; 137/68, 70; 192/30 W; 403/2, 27, 31

[56] References Cited

U.S. PATENT DOCUMENTS

| 1,414,075 | 4/1922 | Dodds | 73/40 |
| 2,325,213 | 7/1943 | Allbright | 99/468 |
| 3,070,109 | 12/1962 | Crandall | 137/68R |
| 3,241,402 | 3/1966 | Crowell | 408/14 |
| 3,747,510 | 7/1973 | Gladd | 99/468 |

Primary Examiner—Harvey C. Hornsby
Assistant Examiner—Robert Pous
Attorney, Agent, or Firm—Reising, Ethington, Barnard, Perry & Brooks

[57] ABSTRACT

An overload indicator particularly adapted for use with driving and driven components of a meat processing system conveyor to indicate when an overload condition takes place. A frangible member of the indicator is preferably embodied as a shear pin that normally connects the driving and driven components and includes an internal gas chamber which is communicated with the environment as the pin fractures in shear due to overloading. Pressurized gas supplied to the gas chamber of the shear pin decreases in pressure as the pin fractures and this pressure decrease is sensed to indicate the occurrence of an overload condition. A conduit for supplying the pressurized gas to the gas chamber of the shear pin preferably includes a restricted orifice through which the gas is fed by a compressor, and a pressure sensitive valve downstream from the restricted orifice senses the pressure decrease due to an overloading pin fracture. The driving and driven components of a meat processing system conveyor incorporating the indicator are preferably a driven reciprocating beam and a drive cylinder that reciprocates the beam. A flexible hose is connected to the shear pin within a housing of the system and feeds the pressurized gas to the shear pin which moves along with the reciprocating beam. The overload indicator is preferably interconnected with the drive cylinder operation so as to terminate its operation when an overload condition occurs.

3 Claims, 3 Drawing Figures

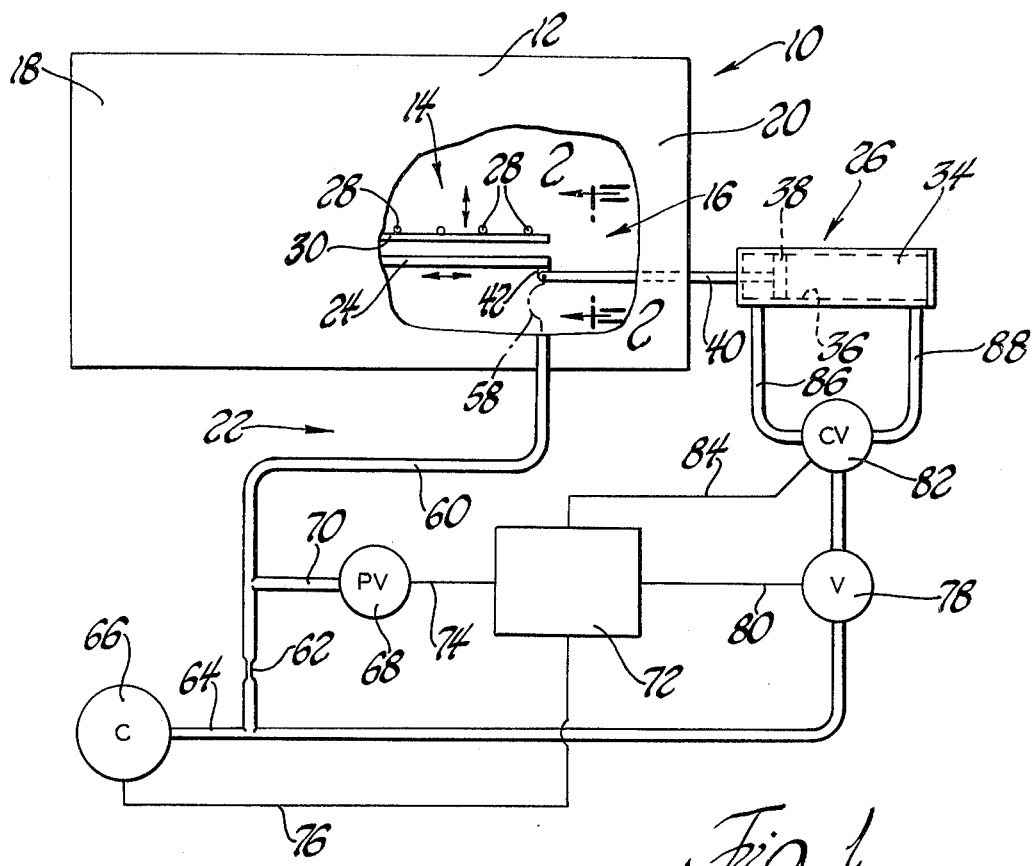
Fig. 1
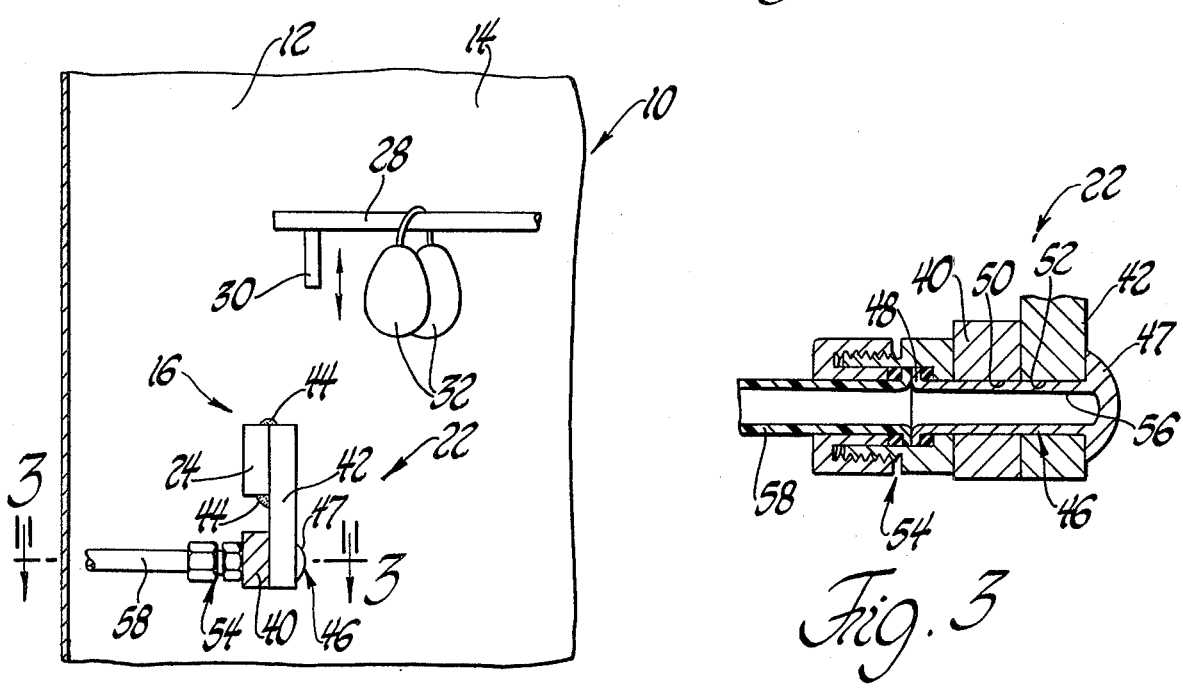
Fig. 2
Fig. 3

OVERLOAD INDICATOR

BACKGROUND OF THE INVENTION

1. Field of the Invention

The present invention relates to an overload indicator for sensing the occurrence of an overload condition between driving and driven components and to a meat processing system having a conveyor with driving and driving components connected by such an indicator.

2. Description of the Prior Art

To prevent failing of machine and mechanism components due to an overload condition, it is well known to utilized a frangible member such as a shear pin for interconnecting driving and driven components. Fracture of the shear pin uncouples the driving and driven components such that there is no failure of these components. Subsequent replacement of the shear pin reconnects the driving and driven components to again establish the driving relationship. Other overload connections and couplings or the like have also been provided prior to this time. See for example the disclosures of U.S. Pat. Nos. 2,539,534; 2,575,475; 2,855,233; and 3,247,735.

A meat processing system of the type with which the overload indicator of the present invention is particularly adapted for usage is disclosed by U.S. Pat. No. 3,747,510, issued July 24, 1973 and assigned to the assignee of the present invention.

SUMMARY OF THE INVENTION

An object of the present invention is to provide an overload indicator including frangible member for connecting driving and driven components so that fracture thereof upon being subjected to an overload condition exhausts pressurized gas supplied to an internal gas chamber of the member such that a sensing of the consequent decreased gas pressure indicates the occurrence of the overload condition.

Another object of the present invention is to provide a meat processing system including a conveyor having driving and driven components that are interconnected by a frangible member with an internal gas chamber that is supplied pressurized gas so that fracture of the member upon overloading exhausts the gas to the environment and permits a sensing of the consequent gas pressure decrease to indicate the occurrence of the overload condition.

In carrying out the above objects, the frangible member is preferably embodied as a shear pin that fails in a shear mode to communicate its internal gas chamber to the environment so as to cause the gas pressure decrease that is sensed to indicate the occurrence of an overload condition. A conduit supplies pressurized gas to the chamber from a gas compressor and preferably includes a restricted orifice through which the gas is fed. A pressure sensitive valve senses the gas pressure in the conduit downstream from the restricted orifice. The orifice restricts gas flow from the compressor sufficiently so as to ensure the pressure decrease at the valve upon pin fracture due to overloading. The supply conduit includes a flexible hose connected to the shear pin to permit relative movement of the pin and the driving and driven components coupled to each other by the pin.

A meat processing system of the preferred embodiment includes a conveyor incorporating the overload indicator. Meat products or the like are conveyed through a processing chamber by the conveyor which includes driving and driven components that are interconnected by the frangible member of the indicator so that its fracture detects the occurrence of an overload condition. The conveyor is preferably of the reciprocating type wherein a beam is reciprocated forwardly and rearwardly by a drive cylinder, with the products being processed lifted upwardly off the beam after a forward reciprocation, and with the products returned to the beam after a rearward reciprocation and prior to another forward reciprocation in a manner that causes forward product advancement. Operation of the drive cylinder for reciprocating the beam is preferably coupled to the indicator so as to terminate its operation upon the occurrence of an overload condition. The flexible hose of the gas conduit extends into the processing chamber to provide the pressurized gas supply for the overload indicator.

The objects, features and advantages of the present invention are readily apparent from the following detailed description of the preferred embodiment taken in connection with the accompanying drawings.

BRIEF DESCRIPTION OF THE DRAWINGS

FIG. 1 is a partially broken away and partially schematic view of a meat processing system incorporating an overload indicator constructed in accordance with the present invention;

FIG. 2 is a partially sectioned view taken along line 2—2 of FIG. 1; and

FIG. 3 is a sectional view taken along line 3—3 of FIG. 2.

DETAILED DESCRIPTION OF THE PREFERRED EMBODIMENT

Referring to FIG. 1 of the drawings a meat processing system collectively indicated by 10 includes a housing 12 defining a processing chamber 14. A conveyor 16 of the system conveys meat products or the like through the processing chamber 14 moving from the left-hand load end 18 of the housing 12 to its right-hand unload end 20. An overload indicaor collectively indicated by 22 is associated with the conveyor 16 so as to detect the occurrence of an overload condition thereof in a manner that is hereinafter fully described.

Conveyor 16 includes an elongated reciprocating beam 24 that is moved longitudinally with respect to the housing 12 in a direction extending between its load and unload ends 18 and 20 by a drive cylinder 26. Products to be processed are hung on product sticks 28 that are lifted and lowered vertically by a lifting arm 30. The product sticks 28 extend laterally between the opposite sides of housing 12 and have opposite ends respectively associated with a reciprocating beam 24 and a lifting arm 30 at each side of the housing, however for purposes of illustration these components are shown only at one side of the housing. As seen in FIG. 2, products to be processed such as the hams 32 are hung on the product stick 28 between the lifting arms 30 at each side of the housing. After a forward reciprocation to the right of the beam 24 by the drive cylinder 26 shown in FIG. 1, the lifting arm 30 is raised by a suitable mechanism, not shown, to lift the product sticks 28 upwardly to the position shown. Subsequently, the drive cylinder 26 moves reciprocating beam 24 rearwardly to the left and the product sticks 28 are then lowered by the lifting arm 30 back onto the beam to be moved forwardly by another forward reciprocation. Product sticks with products to be processed hung thereon are continually loaded onto the left-hand end of the reciprocating beam 24 at the load end 18 of the housing through a suitable doorway and are continually unloaded from the unload end 20 at the right-hand end of the housing through another doorway. Within the processing chamber 14 of the housing, suitable processing may take place such as cooking, smoking, curing, cleansing, and chilling, etc. For a more detailed description of the type of processing involved and the type of mechanism which may be used to raise and lower the product sticks 28, reference should be made to the aforemetioned U.S Pat. No. 3,747,510 whose entire disclosure is hereby incorporated by reference.

Drive cylinder 26 of the conveyor includes a cylinder housing 34 that defines a bore 36 in which a piston 38 slides in a sealed relationship. A connecting rod portion 40 of the piston 38 extends outwardly through an aperture in the left-hand end of cylinder housing 34 and into the system housing 12 for connection to the right-hand end of reciprocating beam 24. Connecting rod portion 40 of the drive cylinder and reciprocating beam 24 respectively function as driving and driven components of the conveyor 16. The occurrence of an overload condition between these driving and driven components is detected by the overload indicator 22.

As seen by combined reference to FIGS. 1 and 2, the right-hand end of conveyor beam 20 includes a projection 42 secured thereto by welds 44 in a downwardly projecting fashion. The lower end of projection 42 is connected to the extreme end of the cylinder piston connecting rod portion 40 by a frangible member preferably embodied as the shear pin 46 shown in FIG. 3. This shear pin 46 fractures at the engaged interfaces of the cylinder piston connecting rod portion 40 and the beam projection 42 in a shear mode upon being subjected to an overload condition between these components of the conveyor. Between its headed right-hand end 47 and its flanged left-hand end 48, shear pin 46 extends through aligned apertures 50 and 52 in the cylinder rod portion 40 and the beam projecting portion 42, respectively, and is secured in position by a threaded coupling assembly 54 so as to maintain these driving and driven components in engagement with each other. An enclosed gas chamber 56 of shear pin 46 extends between its headed and flanged ends and is communicated with the environment by a fracture of pin 46 as it fails in a shear mode due to an overload condition. Pressurized gas supplied to the chamber 56 through a flexible hose 58 is then exhausted to the environment such that there is a consequent decrease in pressure which is sensed to indicated occurrence of this condition. Coupling assembly 54 secures the flexible hose 58 to the flanged end 48 of the shear pin so as to permit the pressurized gas to be supplied to the gas chamber 56. The drive cylinder 26 and the beam 24 are, of course, uncoupled by the pin fracture to prevent failure of these conveyor components. Also, the flexible hose 58 is sufficiently flexible to permit the reciprocation of the conveyor beam 24 while still providing the pressurized gas to the shear pin during normal operation.

With reference to FIG. 1, the flexible hose 58 for supplying pressurized gas to the shear pin of the indicator extends into the housing 12 and is an extension of a conduit 60. This conduit 60 includes a restricted orifice 62 through which compressed gas such as air flows from the output conduit 64 of a compressor 66. Gas flow through orifice 62 from the compressor is sufficiently small such that there is a prssure drop downstream of the orifice when the shear pin 46 shown in FIG. 3 fractures due to an overload condition. This drop in gas pressure is detected by a pressure sensitive valve 68 communicated with the conduit 60 by a conduit 70 downstream of the restricted orifice 62.

As seen in FIG. 1, a central control panel 72 of the meat processing system is connected to the pressure sensitive valve 68 by a wire conduit bundle 74 so that circuitry of the panel is responsive to occurrence of the overload condition. A wire conduit bundle 76 connnects the control panel to the compressor 66 so as to control its operation. A valve 78 disposed along the output conduit 64 of compressor 66 is also connected to the control panel 72 by a wire conduit bundle 80, while a control valve 82 is also connected to the control panel by a wire conduit bundle 84. Conduits 86 and 88 are alternately fed compressed gas from the compressor through valve 82 so as to cause sliding movement of the cylinder piston 38 within the cylinder 34 of drive cylinder 26. Compressed gas supplied through conduit 86 causes piston movement to the right to reciprocate beam 24 in its forward direction, while compressed gas supplied through conduit 88 causes piston movement to the left in order to drive beam 24 in its rearward direction. Suitable circuitry of control panel 72 actuates the valve 82 so that it alternately supplies compressed gas to conduits 86 and 88 from the compressor during normal operation of the meat processing system. However, when an overload condition is detected by the overload indicator 22, the conduit bundle 80 actuates valve 78 so as to terminate the flow of pressurized gas to the valve 82 and to the drive cylinder 26. Thus, the operation of the system automatically shuts down upon occurrence of overload condition. Another drive cylinder such as cylinder 26 associated with the reciprocating beam at the opposite lateral side of the system and fed fluid tapped from conduits 86 and 88 then also ceases its operation concomitant with the drive cylinder shown to terminate the advancement of the product sticks 28 at their opposite ends.

While a preferred embodimet of the overload indicator and the meat processing system it is utilized with have herein been disclosed in detail, those familiar with the art will recognize various alternative designs and embodiments for practicing the present invention as defined by the following claims.

What is claimed is:

1. A meat processing system for processing meat products for the like, the system comprising;
   a housing including a chamber in which the products are processed;
   a conveyor including a reciprocating beam for conveying the products through the chamber and a drive cylinder for reciprocating the beam;
   an overload indicator including a frangible member connecting the beam and drive cylinder of the conveyor so as to fracture upon being subjected to an overload condition therebetween; said frangible member having an internal gas chamber that is communicated with the environment upon fracture due to an overload condition; conduit means including a restricted orifice for supplying pressurized gas to the gas chamber from a gas compressor; and means for sensing a decrease in gas pressure within the conduit means downstream from the restricted orifice so as to thereby detect the occurrence of an overload condition; and means for terminating operation of the drive cylinder when the overload condition is sensed by the indicator.

2. A system as claimed in claim 1 wherein the conduit means includes a flexible hose connected to the frangible member.

3. A meat processing system for processing meat products or the like, the system, comprising:
- a housing including a chamber in which the products are processed;
- a conveyor for conveying the products through the chamber and including driving means and a driven component; and
- an overload indicator including a frangible member for connecting the driving means and the driven component of the conveyor so as to fracture upon being subjected to an overload condition therebetween; said frangible member having an internal gas chamber that is communicated with the environment upon fracture due to an overload condition; conduit means including a restricted orifice for supplying pressurized gas to the gas chamber; and means for sensing a decrease in gas pressure within the conduit means downstream from the restricted orifice so as to thereby detect the occurrence of an overload condition; and
- means for terminating operation of the drive means when the overload condition is sensed by the indicator.

* * * * *